(12) United States Patent
Ma et al.

(10) Patent No.: US 9,596,187 B2
(45) Date of Patent: Mar. 14, 2017

(54) TIME-TRIGGERED ETHERNET-BASED DATA TRANSMISSION METHOD AND NODE DEVICE

(71) Applicant: KYLAND TECHNOLOGY CO., LTD, Shijingshan District, Beijing (CN)

(72) Inventors: Huayi Ma, Beijing (CN); Jie Ding, Beijing (CN); Baihua Xue, Beijing (CN)

(73) Assignee: KYLAND TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 14/646,693

(22) PCT Filed: Nov. 30, 2012

(86) PCT No.: PCT/CN2012/085598
§ 371 (c)(1),
(2) Date: May 21, 2015

(87) PCT Pub. No.: WO2014/079091
PCT Pub. Date: May 30, 2014

(65) Prior Publication Data
US 2015/0295843 A1    Oct. 15, 2015

(30) Foreign Application Priority Data

Nov. 23, 2012  (CN) .......................... 2012 1 0484945

(51) Int. Cl.
*H04L 12/413*  (2006.01)
*H04L 12/865*  (2013.01)
(Continued)

(52) U.S. Cl.
CPC ........ *H04L 47/6275* (2013.01); *H04J 3/0694* (2013.01); *H04L 12/40* (2013.01);
(Continued)

(58) Field of Classification Search
CPC ..... H04L 2012/6435; H04L 2012/6459; H04L 12/417; H04L 41/0213;
(Continued)

(56) References Cited

U.S. PATENT DOCUMENTS 6,115,393 A * 9/2000 Engel .................. H04L 41/0213
370/469
8,566,843 B2 * 10/2013 Fuchs ..................... G06F 9/542
709/230

(Continued)

FOREIGN PATENT DOCUMENTS

| CN | 101292488 A | 10/2008 |
| CN | 102255803 A | 11/2011 |
| CN | 102624620 A | 8/2012 |

*Primary Examiner* — Raj Jain
(74) *Attorney, Agent, or Firm* — TIPS Group (57) ABSTRACT

A time-triggered Ethernet (TTE)-based data transmission method and node device, solving the problem of wasting network bandwidth resources in the prior art during TTE-based data transmission; in the method, a main node determines a scheduling period table based on a time-triggered packet; when a node has a to-be-transmitted event-triggered packet, and the node determines, according to the information stored in the scheduling period table, that a physical link occupied by the event-triggered packet is not in conflict with a physical link corresponding to the current time slot, the node transmits the event-triggered packet in the current time slot. The main node does not need to separately allocate time for the event-triggered packet of each node. Therefore, when a node has a to-be-transmitted event-triggered packet, the node can transmit the event-triggered packet in the current time slot as long as the physical link occupied by the event-triggered packet is not in conflict with the physical link corresponding to the current time slot, thus effectively improving data transmission efficiency and network bandwidth utilization.

8 Claims, 5 Drawing Sheets

(51) Int. Cl.
  *H04J 3/06*    (2006.01)
  *H04L 12/40*   (2006.01)
  *H04L 12/403*  (2006.01)

(52) U.S. Cl.
  CPC ...... *H04L 12/4015* (2013.01); *H04L 12/4035* (2013.01); *H04L 12/413* (2013.01)

(58) Field of Classification Search
  CPC ....... H04L 12/413; H04L 47/10; G06F 9/542; G06F 9/546; H04J 3/0694; H04W 74/08; H04W 74/085
  See application file for complete search history.

(56) References Cited

U.S. PATENT DOCUMENTS

| | | | | |
|---|---|---|---|---|
| 2004/0090962 | A1* | 5/2004 | Forest | H03M 13/43 370/392 |
| 2004/0117685 | A1 | 6/2004 | Truchard et al. | |
| 2015/0229585 | A1* | 8/2015 | Kim | H04L 12/40163 370/244 |
| 2015/0295843 | A1* | 10/2015 | Ma | H04L 12/4015 370/412 |

\* cited by examiner

--Prior art--

| Node information | Timeslot information(ms) | Physical link information |
|---|---|---|
|  |  |  |

TIME-TRIGGERED ETHERNET-BASED DATA TRANSMISSION METHOD AND NODE DEVICE

This application is a US National Stage of International Application No. PCT/CN2012/085598, filed on 30 Nov. 2012, designating the United States, and claiming the benefit of Chinese Patent Application No. 201210484945.6, filed with the State Intellectual Property Office of People's Republic of China on Nov. 23, 2012 and entitled "Method and node device for transmitting data based on a Time Triggered Ethernet", which is hereby incorporated by reference in its entirety.

FIELD

The present invention relates to the field of Ethernet technologies and particularly to a method and node device for transmitting data based on a Time Triggered Ethernet (TTE).

BACKGROUND

In recent years, the Ethernet has been significantly developed in the field of industry control into a widely applied local area network technology, and an industry control network can intercommunicate with the global Internet conveniently by using the Ethernet. Moreover a large number of upper protocols have been applied successfully to the Ethernet technology, for example, the TCP/IP protocol has been applied successfully to the Ethernet technology, so the Ethernet can be applied conveniently in various applications.

A bus access scheme in the Time Triggered Architecture (TTA) is embodied as a Time Division Multiple Access (TDMA) scheme, where there are several timeslots included in one TDMA cycle. At most one of the timeslots in each cycle can be occupied by one switch, and the respective switches may transmit different data in each cycle.

With the Time Triggered Ethernet (TTE), a time trigger is made instead of an event trigger so that a communication task is transmitted based on a timing trigger by reasonable schedule to be temporally triggered for transmission to thereby ensure contention for a physical link in data transmission so as to guarantee real-time data transmission.

The TTE in the prior art can address the problem of contention for a physical link between devices to thereby guarantee real-time data transmission. Due to the TTE technology, although the problem of contention for a physical link between devices throughout the network can be solved, a considerable waste of bandwidth resources in the network may come therewith.

Figure 1:
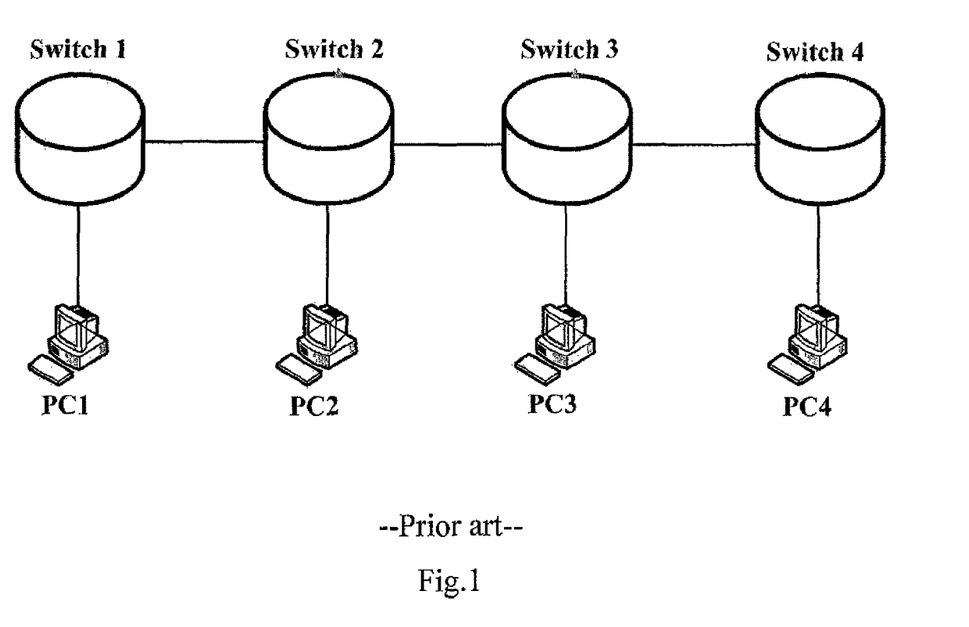
FIG. 1 illustrates a schematic diagram of data transmission based on the TTE in the prior art.

The following description will be given with reference to the drawings. FIG. 1 illustrates a schematic diagram of data transmission based on the TTE in the prior art. The network includes a plurality of Personal Computers (PCs) (nodes) including P1 to P4 respectively, and a plurality of switches including a switch 1, a switch 2, a switch 3 and a switch 4 respectively. Here data need to be transmitted in real time between the PC1 and the PC2, data need to be transmitted in real time between the PC2 and the PC3, and data need to be transmitted in real time between the PC3 and the PC4. In each scheduling cycle, a primary node allocates a timeslot to each of nodes so that in the timeslot allocated to the node, the entire physical link in a local area network, where the node is located, is for exclusive use by the node.

For example, data need to be transmitted in real time between the PC1 and the PC2, between the PC2 and the PC3, and between the PC3 and the PC4 through the switch 1 to the switch 2, the switch 2 to the switch 3, and the switch 3 to the switch 4 respectively. The primary node allocates timeslots to the PC1, the PC2 and the PC3 respectively in a temporally sequential order in each scheduling cycle. The PC1 transmits data through the physical link of the switch 1 to the switch 2 in the timeslot allocated thereto.

In the TTE mechanism, the same primary node can schedule only one node in one timeslot even if the physical links where the other nodes are currently located are not occupied. As no timeslots have been currently allocated to the other nodes, their physical links have to be idle. For example at this time the PC1 occupies the physical link of the switch 1 to the switch 2, and the entire physical link of the switch 1 to the switch 2 to the switch 3 to the switch 4 in the local area network where the PC1 is located is occupied by the PC1, so at this time even if the switch 2 to the switch 3, and the switch 3 to the switch 4 are idle, they may not be available to the other nodes, thus resulting in a considerable waste of network bandwidths, and the waste of network bandwidths will be exacerbated if there are a larger number of nodes in the physical link of the local area network.

SUMMARY

Embodiments of the invention provide a method and node device for transmitting data based on a time triggered Ethernet (TTE) so as to address the problem of a waste of network bandwidths in data transmission based on the TTE in the prior art.

The present invention provides a method for transmitting data based on a time triggered Ethernet (TTE), the method including:

receiving, by each node, a scheduling period table, determined from time-triggered messages, transmitted by a primary node;

determining, by a node, when the node has an event-triggered message to be transmitted, a physical link corresponding to the event-triggered message;

judging, according to the physical link, timeslot allocation information and information about physical link corresponding to each timeslot, stored in the scheduling period table, whether the physical link collides with a physical link corresponding to a current timeslot; and transmitting the event-triggered message in the current timeslot when it is determined that there is no collision.

The invention provides a device for transmitting data over a time triggered Ethernet, the device including:

a receiving module configured to receive a scheduling period table, determined from time-triggered messages, transmitted by a primary node;

a determining module configured, when there is an event-triggered message to be transmitted, to determine a physical link corresponding to the event-triggered message;

a judging module configured to judge, according to the physical link, timeslot allocation information and information about physical link corresponding to each timeslot, stored in the scheduling period table, whether the physical link collides with a physical link corresponding to a current timeslot; and a transmitting module configured to transmit the event-triggered message in the current timeslot when the judging module determines that there is no collision.

The embodiments of the present invention provide a method and node device for transmitting data based on a TTE, and in the method, the primary node determines a scheduling period table from time-triggered messages, and when each node has an event-triggered message to be transmitted, the node transmits the event-triggered message in the current timeslot upon determining from the information stored in the scheduling period table that a physical link occupied by the event-triggered message does not collide with a physical link corresponding to the current timeslot. In the present invention, the primary node will not allocate timeslots separately for the event-triggered messages of the respective nodes, and when each node has the event-triggered message to be transmitted, the node can transmit the event-triggered message in the current timeslot as long as the physical link occupied by the event-triggered message does not collide with the physical link corresponding to the current timeslot to thereby effectively improve the efficiency of data transmission and the utilization ratio of network bandwidths.

DETAILED DESCRIPTION OF THE EMBODIMENTS

The invention provides a method and node device for transmitting data based on a Time-Triggered Ethernet (TTE) to thereby effectively improve the utilization ratio of network bandwidths in a mechanism of transmitting data based on the TTE.

The invention will be described below in details with reference to the drawings.

Figure 2:
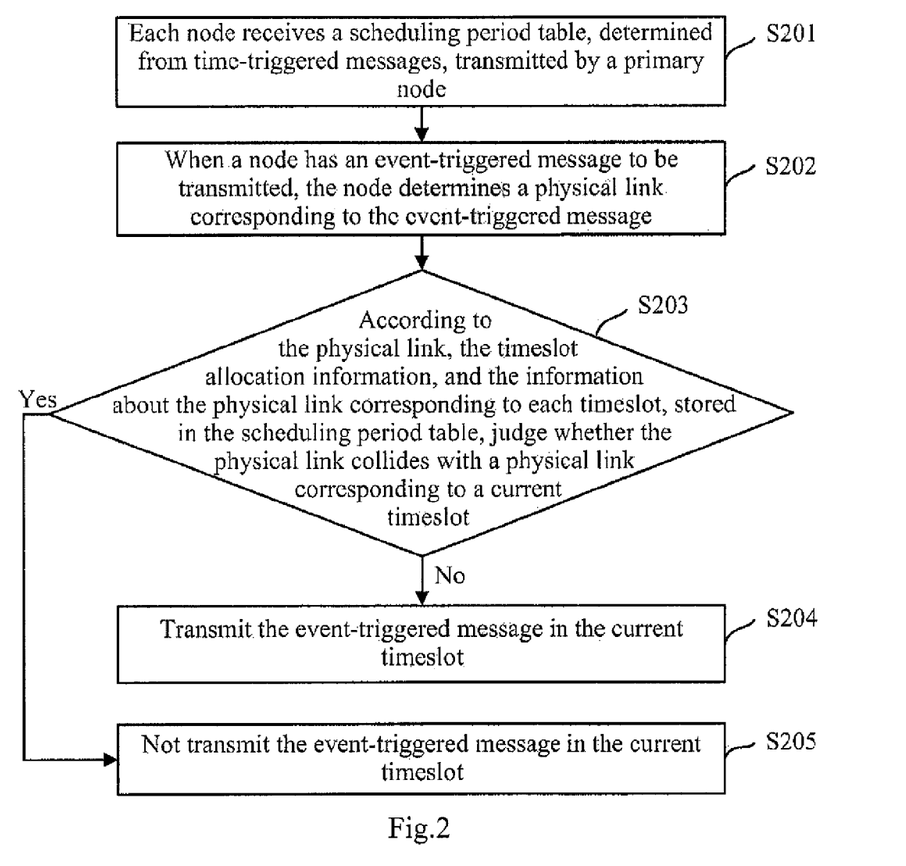
FIG. 2 illustrates a schematic diagram of the process of data transmission based on the TTE according to a particular embodiment of the invention.

FIG. 2 illustrates a schematic diagram of a process of transmitting data based on a TTE according to a particular embodiment of the invention, and the process includes the following operations:

Operation 201: Each node receives a scheduling period table determined from time-triggered message, transmitted by a primary node.

In the present invention, the primary node determines the scheduling period table from information about the number of bytes included in the time-triggered message transmitted by each node in one cycle, and information about physical link occupied by the time-triggered message. That is, the scheduling period table includes a correspondence relationship between information about each node, information about timeslot allocated to the node, and information about physical links occupied by the node for transmitting message in the timeslot.

After the primary node generates the scheduling period table, the primary node transmits the scheduling period table to each node, so that each node can use the scheduling period table when transmitting an event-triggered message.

Operation 202: When a node has an event-triggered message to be transmitted, the node determines a physical link corresponding to the event-triggered message.

Since each message includes information about a source address, and information about a destination address, for the transmission of the message, the physical link corresponding to the message can be determined from the message.

Operation 203: It is judged, according to the physical link, the timeslot allocation information, and the information about the physical link corresponding to each timeslot, stored in the scheduling period table, whether the physical link collides with a physical link corresponding to a current timeslot, and if not, then the process goes to the operation 204; otherwise, the process goes to the operation 205.

Here in the present invention, as long as at least one of nodes in the physical link is the same as one of nodes in the physical link corresponding to the current timeslot, it is determined that these two physical links collide. For example, the physical link corresponding to the event-triggered message is A-B-C, and the physical link corresponding to the current timeslot is a-b-c, and since none of the nodes in these two physical links are the same, it is determined that these two physical links do not collide; and when the physical link corresponding to the event-triggered message is A-B-C, and the physical link corresponding to the current timeslot is A-B-c, and since the nodes A and B are included in both of the physical links, it can be determined that these two physical links collide.

Operation 204: The event-triggered message is transmitted in the current timeslot.

When the physical link corresponding to the event-triggered message does not collide with the physical link corresponding to current timeslot, the event-triggered message can be transmitted in the current timeslot, and since the physical link occupied by the event-triggered message does not collide with the physical link corresponding to the current timeslot, the event-triggered message can be transmitted without any influence on message transmission in the current timeslot.

Operation 205: The event-triggered message is not transmitted in the current timeslot.

When the physical link occupied by the event-triggered message collides with the physical link corresponding to the current timeslot, the event-triggered message may not be transmitted to thereby guarantee message transmission in the current timeslot.

In the present invention, the primary node determines the scheduling period table from time-triggered messages, where the scheduling period table includes the timeslot allocated to each node, and the physical links occupied by the node for transmitting the time-triggered message in the timeslot, and transmits the scheduling period table to each node. When the node has an event-triggered message to be transmitted, according to the locally stored scheduling period table and the physical link occupied by the event-triggered message, the node judges whether the physical link collides with the physical link corresponding to the current timeslot, and transmits the event-triggered message in the current timeslot when there is no collision.

In the present invention, the primary node will not allocate timeslots separately for the event-triggered messages of the respective nodes, and when each node has an event-triggered message to be transmitted, the node can transmit the event-triggered message in the current timeslot as long as the physical link occupied by the event-triggered message does not collide with the physical link corresponding to the current timeslot to thereby effectively improve the efficiency of data transmission and the utilization ratio of network bandwidths.

In the present invention, the primary node determines the scheduling period table from time-triggered messages transmitted by the respective nodes in one cycle. Here each node reports time-triggered message transmission request to the primary node, and here the transmission request carries information about the number of bytes included in time-triggered message transmitted by the node in one cycle, and information about source address and destination address of the time-triggered message.

Upon reception of the transmission request transmitted by each node, the primary node determines a time required for transmitting the time-triggered message, according to the information about the number of bytes included in the time-triggered message carried in the transmission request, and allocates the timeslot to the node according to the time; and determines the physical link occupied by the time-triggered message according to the information about the source address and the destination address of the time-triggered message carried in the transmission request; and the primary node generates the scheduling period table according to the timeslot allocated to each node, and the physical link occupied by each node for transmitting the time-triggered message, and transmits the scheduling period table to each node.

Figure 3:
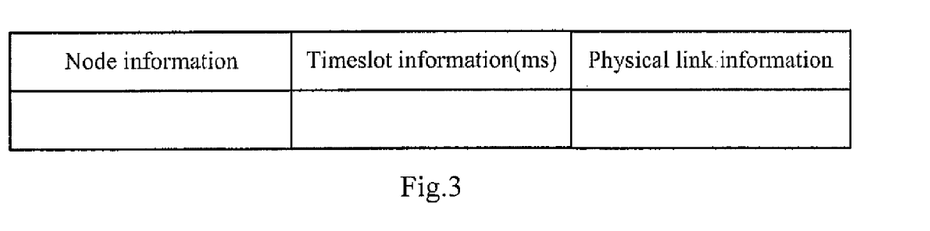
FIG. 3 illustrates a schematic structural diagram of a scheduling period table generated by the primary node according to an embodiment of the invention.

Each node receives and stores the scheduling period table transmitted by the primary node, and here the scheduling period table includes the information about the timeslot allocated to each node in one cycle, and the information about the physical link over which the node corresponding to the timeslot transmits the time-triggered message FIG. 3 illustrates a schematic structural diagram of the scheduling period table generated by the primary node according to the embodiment of the invention, and the scheduling period table includes the information about each node, the information about the timeslot allocated to the node, and the information about the physical link occupied by the node when transmitting the message in the timeslot. Particularly the information about the node can be identification information of the node, the information about the timeslot allocated to the node can identify start time and end time of the timeslot, and the information about the physical link can include identification information of respective nodes by which the physical link is formed.

In the present invention, no timeslots will be reallocated for event-triggered messages, and when the node has an event-triggered message to be transmitted, the node transmits the event-triggered message upon determining that the physical link corresponding to the current timeslot does not collide with the physical link over which the node transmits the event-triggered message, according to the scheduling period table determined by the primary nodes for the transmission of time-triggered messages of each node. In the present invention, the current timeslot is a timeslot corresponding to a current event. When the respective nodes are transmitting the messages upon determining from the physical links that there is no confliction, if there are a large number of bytes included in the event-triggered message of some node, then such a problem may arise that the event-triggered message fails to be transmitted. Thus in the present invention, the information about the number of bytes included in the event-triggered message can be further taken into account in the present invention to thereby further improve the efficiency and the success ratio of data transmission as well as the utilization ratio of network bandwidths.

Figure 4:
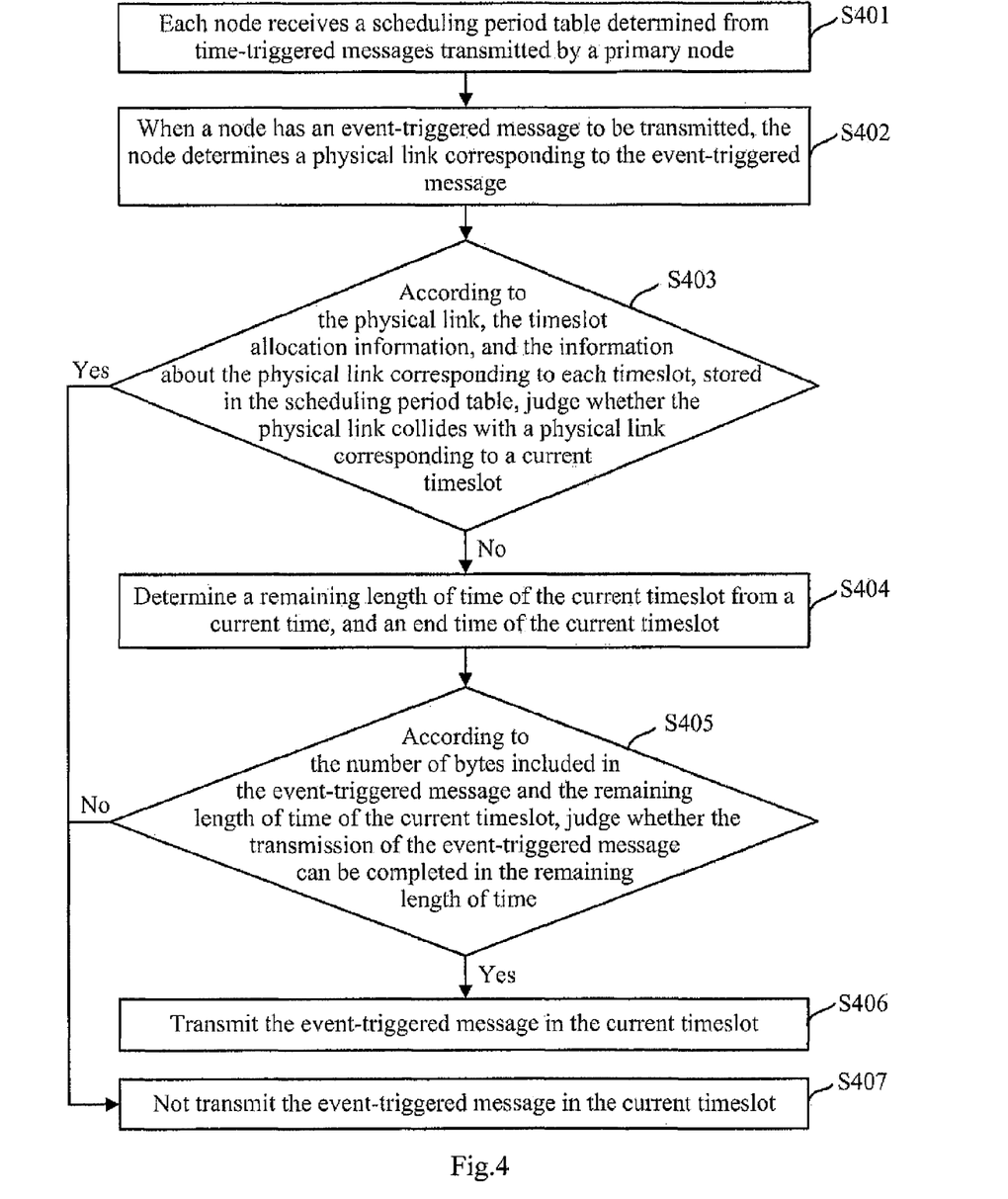
FIG. 4 illustrates a particular implementation of a method for transmitting data based on the TTE according to an embodiment of the invention.

FIG. 4 illustrates a particular implementation of a method for transmitting data based on the TTE according to an embodiment of the invention, and the process includes the following operations:

Operation 401: Each node receives a scheduling period table determined from time-triggered messages transmitted by a primary node.

Operation 402: When a node has an event-triggered message to be transmitted, the node determines a physical link corresponding to the event-triggered message.

Here the physical link corresponding to the event-triggered message, which can also be referred to as a physical link occupied by the event-triggered message, is determined from information about a source address, and information about a destination address, in the event-triggered message.

Operation 403: It is judged, according to the physical link, the timeslot allocation information, and the information about the physical link corresponding to each timeslot, stored in the scheduling period table, whether the physical link collides with a physical link corresponding to a current timeslot, and if not, then the process goes to the operation 404; otherwise, the process goes to the operation 407.

Operation 404: A remaining length of time of the current timeslot is determined from a current time, and an end time of the current timeslot.

Operation 405: It is judged, according to the number of bytes included in the event-triggered message and the remaining length of time of the current timeslot, whether the transmission of the event-triggered message can be completed in the remaining length of time, and if it is determined that the transmission of the event-triggered message can be completed in the remaining length of time, then the process goes to the operation 406; otherwise, the process goes to the operation 407.

Operation 406: The event-triggered message is transmitted in the current timeslot.

Operation 407: The event-triggered message is not transmitted in the current timeslot.

In order to effectively improve the efficiency of data transmission and the utilization ratio of bandwidths and to guarantee the success ratio of data transmission, in the above embodiment of the present invention, when the node has an event-triggered message to be transmitted, the node determines a physical link corresponding to the event-triggered message, and judges whether the physical link collides with the physical link for the current timeslot corresponding to the current time, according to the information recorded in the locally stored scheduling period table, and the node can further judge whether the remaining time of the current timeslot is sufficient to transmit the event-triggered message, upon determining that the physical link does not collide with the physical link corresponding to the current timeslot.

The node determines the remaining length of time of the current timeslot according to the current time and the end time of the current timeslot, upon determining that the physical link does not collide with the physical link corresponding to the current timeslot; and the node judges, according to the number of bytes included in the event-triggered message, and the remaining length of time of the current timeslot, whether the transmission of the event-triggered message can be completed in the remaining length of time.

Particularly since the number of bytes included in the event-triggered message is determined, the node can further determine a length of time for transmitting the event-triggered message including the number of bytes, and moreover since the remaining length of time of the current timeslot can also be determined, the length of time for transmitting event-triggered message can be compared with the remaining length of time, and if the length of time for transmitting the event-triggered message is longer than the remaining length of time, then it is determined that the transmission of the event-triggered message can not be completed in the remaining length of time; otherwise, if the length of time for transmitting the event-triggered message is no longer than the remaining length of time, then it is determined that the transmission of the event-triggered message can be completed in the remaining length of time. When the transmission of the event-triggered message can be completed in the remaining length of time, the event-triggered message is transmitted in the current timeslot.

When it is determined that the physical link occupied by the event-triggered message does not collide with the physical link corresponding to the current timeslot, in order to guarantee the success ratio of transmitting the message, it is judged whether the event-triggered message can be transmitted in the current timeslot, according to the number of bytes included in the event-triggered message, and the remaining length of time of the current timeslot in the present invention.

When the transmission of the event-triggered message can not be completed in the remaining length of time of the current timeslot, the event-triggered message may not be transmitted in the current timeslot. However in order to further improve the utilization ratio of network bandwidths and to effectively improve the efficiency of data transmission, it can be further judged whether the event-triggered message can be transmitted in the next timeslot or the timeslot after next of the current timeslot in the invention.

Figure 5:
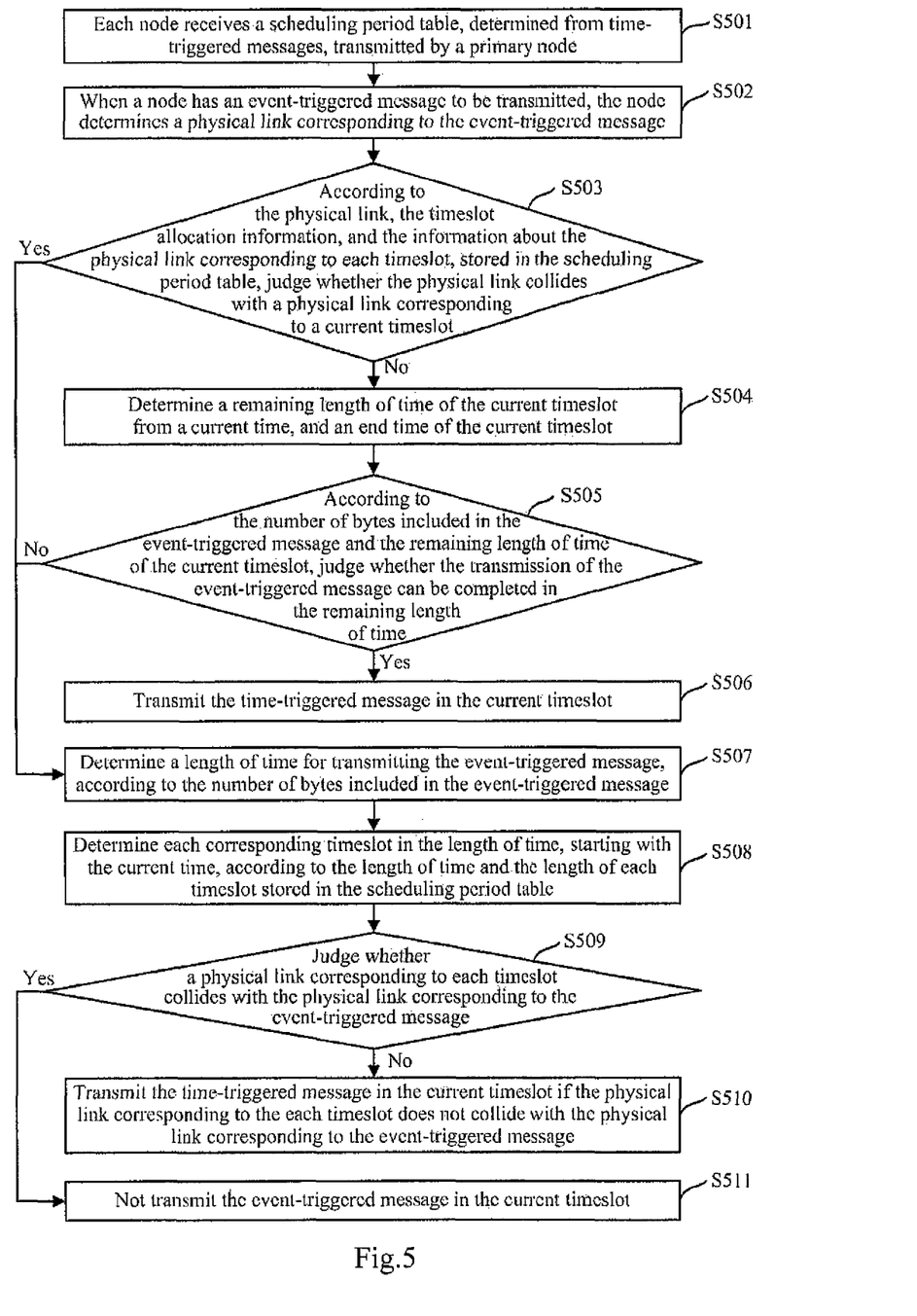
FIG. 5 illustrates another particular implementation of a method for transmitting data based on the TTE according to an embodiment of the invention.

FIG. 5 illustrates another particular implementation of a method for transmitting data based on a TTE according to an embodiment of the invention.

Operation 501: Each node receives a scheduling period table determined from time-triggered messages transmitted by a primary node.

Operation 502: When a node has an event-triggered message to be transmitted, the node determines a physical link corresponding to the event-triggered message.

Here the physical link corresponding to the event-triggered message, which can also be referred to as a physical link occupied by the event-triggered message, is determined from information about a source address, and information about a destination address, in the event-triggered message.

Operation 503: It is judged, according to the physical link, the timeslot allocation information, and the information about the physical link corresponding to each timeslot, stored in the scheduling period table, whether the physical link collides with a physical link corresponding to a current timeslot, and if not, then the process goes to the operation 504; otherwise, the process goes to the operation 507.

Operation 504: A remaining length of time of the current timeslot is determined from a current time, and an end time of the current timeslot.

Operation 505: It is judged, according to the number of bytes included in the event-triggered message and the remaining length of time of the current timeslot, whether the transmission of the event-triggered message can be completed in the remaining length of time, and if it is determined that the transmission of the event-triggered message can be completed in the remaining length of time, then the process goes to the operation 506; otherwise, the process goes to the operation 507.

Operation 506: The time-triggered message is transmitted in the current timeslot.

Operation 507: A length of time for transmitting the event-triggered message is determined according to the number of bytes included in the event-triggered message.

Operation 508: Each corresponding timeslot in the length of time is determined, starting with the current time, according to the length of time and the length of each timeslot stored in the scheduling period table.

Operation 509: It is judged whether a physical link corresponding to each timeslot collides with the physical link corresponding to the event-triggered message, and if it is determined that the physical link corresponding to the each timeslot does not collide with the physical link corresponding to the event-triggered message, then the process goes to the operation 510; otherwise, the process goes to the operation 511.

Operation 510: The event-triggered message is transmitted in the current timeslot if the physical link corresponding to the each timeslot does not collide with the physical link corresponding to the event-triggered message.

Operation 511: The time-triggered message is not transmitted in the current timeslot.

In the above embodiment of the present invention, in order to effectively guarantee the transmission of the event-triggered message, when the transmission of the event-triggered message can not be completed in the remaining length of time of the current timeslot, if a next timeslot and a timeslot after next of the current timeslot are taken into account, the length of time for transmitting the event-triggered message is determined according to the number of bytes included in the event-triggered message, and each corresponding timeslot in the current length of time is determined, starting with the current time, according to the length of time and the length of each timeslot included in the scheduling period table. The event-triggered message is transmitted in the current timeslot if none of the physical links corresponding to the respective timeslots coincides with the physical link corresponding to the event-triggered message.

The invention will be described below in details in connection with a particular embodiment thereof.

Referring to FIG. 1, the primary node determines the scheduling period table as depicted in Table below and transmits the scheduling period table to each node.

| Node information | Timeslot information (ms) | Corresponding physical link information |
|---|---|---|
| PC1 | 0~10 | Switch1, Switch2, Switch3 |
| PC3 | 11~32 | Switch3, Switch2 |
| PC4 | 33~82 | Switch4, Switch3 |
| PC2 | 83~100 | Switch2, Switch1 |

The scheduling period table above includes the timeslots allocated to the respective nodes, and the information about the physical links corresponding to the timeslots, in each scheduling cycle with the length of 100 ms. With the scheduling period table, when the PC1 has an event-triggered message to be transmitted at the 34th ms in some scheduling cycle, the PC1 determines the physical link corresponding to the event-triggered message according to the information about the source address, and the information about the destination address, included in the event-triggered message. For example, if the information about the source address included in the event-triggered message is the identification information of the PC1, and the information about the destination address included therein is the identification information of the PC2, the physical link corresponding to the event-triggered message is determined as the switch 1 to the switch 2.

At the 34th ms in the scheduling cycle, the corresponding current timeslot is the timeslot of 33 to 82 corresponding to the PC4, and the physical link corresponding to the current timeslot is the switch 4 to the switch 3, so it is determined that the physical link of the switch 1 to the switch 2 corresponding to the event-triggered message does not collide with the physical link of the switch 4 to the switch 3 corresponding to the current timeslot, and then the PC1 determines that the event-triggered message can be transmitted in the current timeslot.

In order to further improve the utilization ratio of network bandwidths and the efficiency and success ratio of data transmission, in this embodiment, the PC1 can further determine the length of time for transmitting the event-triggered message, and the remaining length of time of the current timeslot, for example, the length of time for transmitting the event-triggered message is 20 ms, and the remaining length of time of the current timeslot is 82−34=48 ms, so the remaining length 48 of time of the current timeslot is longer than the length 20 of time for transmitting the event-triggered message, and thus it is determined that the transmission of the event-triggered message can be completed in the remaining length of time, and the event-triggered message is transmitted in the current timeslot.

If the number of bytes included in the event-triggered message is relatively large, and the length of time for transmitting the event-triggered message is 60 ms, then it is determined that the transmission of the event-triggered message can not be completed in the remaining length of time, and then in order to further improve the utilization ratio of network bandwidths, two corresponding timeslots, which are timeslots corresponding respectively to the PC4 and the PC2, in the length of time 60 ms are determined starting with the current time, and physical links corresponding to these two timeslots are the switch 4 to the switch 3 and the switch 2 to the switch 1 respectively. It is judged whether the physical links corresponding to these two timeslots collide with the physical link of the switch 1 to the switch 2 corresponding to the event-triggered message, and since the physical link of the switch 2 to the switch 1 collides with the physical link of the switch 1 to the switch 2, the event-triggered message can not be transmitted in the current timeslot.

Figure 6:
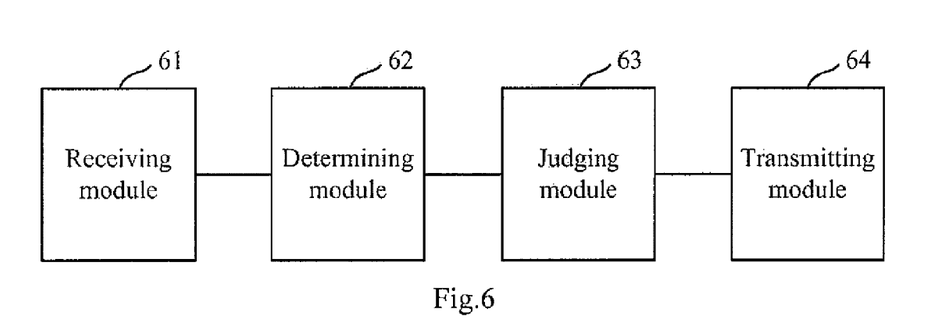
FIG. 6 illustrates a schematic structural diagram of a device node for transmitting data based on the Time-Triggered Ethernet (TTE) according to an embodiment of the invention.

FIG. 6 illustrates a schematic structural diagram of a device node for transmitting data based on a time triggered Ethernet (TTE) according to an embodiment of the invention, and the node device includes:

A receiving module 61 is configured to receive a scheduling period table determined from time-triggered messages transmitted by a primary node;

A determining module 62 is configured, when there is an event-triggered message to be transmitted, to determine a physical link corresponding to the event-triggered message;

A judging module 63 is configured to judge, according to the physical link, timeslot allocation information and information about physical link corresponding to each timeslot, stored in the scheduling period table, whether the physical link collides with a physical link corresponding to a current timeslot; and A transmitting module 64 is configured to transmit the event-triggered message in the current timeslot when the judging module determines that there is no collision.

The transmitting module 64 is further configured to report a time-triggered message transmission request to the primary node, where the transmission request carries information about the number of bytes included in a time-triggered message transmitted by the device in one cycle, and information about a source address and a destination address of the time-triggered message; and The receiving module 61 is further configured to receive and store the scheduling period table transmitted by the primary node, where the scheduling period table includes the information about the timeslots allocated to each node in one cycle, and the information about the physical link over which the node corresponding to the timeslot transmits the time-triggered message.

The judging module 63 is configured to determine sequentially for each node in the physical link whether the node is the same as each of nodes in the physical link corresponding to the current timeslot; and to determine that the physical link collides with the physical link corresponding to the current timeslot, when at least one of the nodes in the physical node is the same as the node in the physical link.

The transmitting module 64 is configured to determine a remaining length of time of the current timeslot according to a current time and an end time of the current timeslot; to judge whether the transmission of the event-triggered message can be completed in the remaining length of time, according to the number of bytes included in the event-triggered message, and the remaining length of time of the current timeslot; and to transmit the event-triggered message in the current timeslot when the transmission of the event-triggered message can be completed in the remaining length of time.

The transmitting module 64 is further configured, when the transmission of the event-triggered message can not be completed in the remaining length of time, to determine a length of time for transmitting the event-triggered message, according to the number of bytes included in the event-triggered message; to determine each corresponding timeslot in the length of time, starting with the current time, according to the length of time and the length of each timeslot stored in the scheduling period table; to judge whether a physical link corresponding to each timeslot collides with the physical link corresponding to the event-triggered message; and to transmit the event-triggered message in the current timeslot when the physical link corresponding to the each timeslot does not collide with the physical link corresponding to the event-triggered message.

The embodiments of the present invention provide a method and node device for transmitting data based on a TTE, and in the method, the primary node determines a scheduling period table from time-triggered messages, and when each node has an event-triggered message to be transmitted, the node transmits the event-triggered message in the current timeslot upon determining from the information stored in the scheduling period table that a physical link occupied by the event-triggered message does not collide with a physical link corresponding to the current timeslot. In the present invention, the primary node will not allocate timeslots separately for the event-triggered messages of the respective nodes, and when each node has the event-triggered message to be transmitted, the node can transmit the event-triggered message in the current timeslot as long as the physical link occupied by the event-triggered message does not collide with the physical link corresponding to the current timeslot to thereby effectively improve the efficiency of data transmission and the utilization ratio of network bandwidths.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram, These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting data based on a time triggered Ethernet, TTE, the method comprising:
receiving, by each node, a scheduling period table, determined from time-triggered messages, transmitted by a primary node;
determining, by a node, when the node has an event-triggered message to be transmitted, a physical link corresponding to the event-triggered message;
judging, according to the physical link, timeslot allocation information and information about physical link corresponding to each timeslot, stored in the scheduling period table, whether the physical link collides with a physical link corresponding to a current timeslot; and
transmitting the event-triggered message in the current timeslot when it is determined that there is no collision by: determining a remaining length of time of the current timeslot from a current time, and an end time of the current timeslot; judging, according to a number of bytes included in the event-triggered message, and the remaining length of time of the current timeslot, whether transmission of the event-triggered message can be completed in the remaining length of time; and transmitting the event-triggered message in the current timeslot when the transmission of the event-triggered message can be completed in the remaining length of time.

2. The method according to claim 1, wherein storing, by the node, the scheduling period table comprises:
transmitting, by the node, a time-triggered message transmission request to the primary node, wherein the transmission request carries information about a number of bytes included in a time-triggered message transmitted by the node in one cycle, and information about a source address and a destination address of the time-triggered message; and
receiving and storing the scheduling period table transmitted by the primary node, wherein the scheduling period table includes the information about a timeslot allocated to the each node in one cycle, and the information about the physical link over which the node corresponding to the timeslot transmits the time-triggered message.

3. The method according to claim 1, wherein judging whether the physical link collides with the physical link corresponding to the current timeslot comprises:
determining sequentially for each node in the physical link whether the node is the same as each of nodes in the physical link corresponding to the current timeslot; and
determining that the physical link collides with the physical link corresponding to the current timeslot, when at least one of the nodes in the physical node is the same as the node in the physical link.

4. The method according to claim 1, wherein when the transmission of the event-triggered message can not be completed in the remaining length of time, transmitting the event-triggered message in the current timeslot comprises:
determining a length of time for transmitting the event-triggered message, according to the number of bytes included in the event-triggered message;
determining, each corresponding timeslot in the length of time, starting with the current time, according to the length of time, and the length of each time slot stored in the scheduling period table;
judging whether a physical link corresponding to each timeslot collides with the physical link corresponding to the event-triggered message; and
transmitting the event-triggered message in the current timeslot when the physical link corresponding to the each timeslot does not collide with the physical link corresponding to the event-triggered message.

5. A device node for transmitting data based on a time triggered Ethernet, TTE, comprising:
- a receiving module configured to receive a scheduling period table, determined from time-triggered messages, transmitted by a primary node;
- a determining module configured, when there is an event-triggered message to be transmitted, to determine a physical link corresponding to the event-triggered message;
- a judging module configured to judge, according to the physical link, timeslot allocation information and information about physical link corresponding to each timeslot, stored in the scheduling period table, whether the physical link collides with a physical link corresponding to a current timeslot; and
- a transmitting module configured to transmit the event-triggered message in the current timeslot when the judging module determines that there is no collision;
- wherein the transmitting module is configured to determine a remaining length of time of the current timeslot from a current time, and an end time of the current timeslot; to judge according to a number of bytes included in the event-triggered message, and the remaining length of time of the current timeslot, whether transmission of the event-triggered message can be completed in the remaining length of time; and to transmit the event-triggered message in the current timeslot when the transmission of the event-triggered message can be completed in the remaining length of time.

6. The node device according to claim 5, wherein the transmitting module is further configured to transmit a time-triggered message transmission request to the primary node, wherein the transmission request carries information about a number of bytes included in a time-triggered message transmitted by the device in one cycle, and information about a source address and a destination address of the time-triggered message; and
the receiving module is further configured to receive and store the scheduling period table transmitted by the primary node, wherein the scheduling period table includes the information about a timeslot allocated to the each node in one cycle, and the information about the physical link over which the node corresponding to the timeslot transmits the time-triggered message.

7. The node device according to claim 5, wherein the judging module is configured to determine sequentially for each node in the physical link whether the node is the same as each of nodes in the physical link corresponding to the current timeslot; and to determine that the physical link collides with the physical link corresponding to the current timeslot, when at least one of the nodes in the physical node is the same as the node in the physical link.

8. The node device according to claim 5, wherein the transmitting module is further configured, the transmission of the event-triggered message can not be completed in the remaining length of time, to determine a length of time for transmitting the event-triggered message, according to the number of bytes included in the event-triggered message; to determine each corresponding timeslot in the length of time, starting with the current time, according to the length of time, and the length of each timeslot stored in the scheduling period table; to judge whether a physical link corresponding to each timeslot collides with the physical link corresponding to the event-triggered message; and to transmit the event-triggered message in the current timeslot when the physical link corresponding to the each timeslot does not collide with the physical link corresponding to the event-triggered message.

* * * * *